United States Patent
Finke-Anlauff et al.

(10) Patent No.: US 7,512,427 B2
(45) Date of Patent: Mar. 31, 2009

(54) MULTI-FUNCTION ELECTRONIC DEVICE WITH NESTED SLIDING PANELS

(75) Inventors: Andrea Finke-Anlauff, Braunschweig (DE); Torsten Gunther, Braunschweig (DE); Lutz Cordes, Hannover (DE); Jouko Pirila, Turku (FI)

(73) Assignee: Nokia Corporation, Espoo, FL (US)

( * ) Notice: Subject to any disclaimer, the term of this patent is extended or adjusted under 35 U.S.C. 154(b) by 378 days.

(21) Appl. No.: 11/219,310

(22) Filed: Sep. 2, 2005

(65) Prior Publication Data

US 2007/0053145 A1    Mar. 8, 2007

(51) Int. Cl.
*H04M 1/00* (2006.01)
(52) U.S. Cl. .............. 455/575.1; 455/575.3; 455/575.4; 455/556.2; 345/168
(58) Field of Classification Search .............. 455/575.1, 455/575.3, 575.4, 556.2; 345/168
See application file for complete search history.

(56) References Cited

U.S. PATENT DOCUMENTS

| | | | |
|---|---|---|---|
| 5,898,161 A * | 4/1999 | DeVita et al. | 235/462.44 |
| 6,707,664 B2 * | 3/2004 | Murphy | 361/680 |
| 7,120,458 B2 * | 10/2006 | Wendorff et al. | 455/550.1 |
| 2004/0207604 A1 * | 10/2004 | Chuang | 345/168 |
| 2005/0070348 A1 * | 3/2005 | Lee et al. | 455/575.4 |
| 2005/0168446 A1 * | 8/2005 | Majdoub | 345/168 |

* cited by examiner

*Primary Examiner*—Minh D Dao
(74) *Attorney, Agent, or Firm*—Perman & Green, LLP

(57) ABSTRACT

In a multi-function electronic device, consists of a display mounted on the body of the device and two slidable panels mounted in the body for extension and retraction into the body. The body includes a base panel extending outward. One panel contains a keypad for use in conjunction with the display. The other panel contains a portion of a full function keyboard that cooperates with another portion of the full function keyboard mounted on the base panel. The full function keyboard is provided for operation with the display.

17 Claims, 4 Drawing Sheets

MULTI-FUNCTION ELECTRONIC DEVICE WITH NESTED SLIDING PANELS

BACKGROUND OF THE INVENTION

1. Field of the Invention

The subject matter of this application relates to an arrangement of components that combines the functions of a multi-use electronic device to optimize their usefulness. More specifically, this application describes an electronic device having multiple panels mounted for sliding motion on a body.

2. Brief Description of Related Developments

Mobile telephones and similar communication devices now provide a multitude of services, such as, Internet access, personal information management, facsimile, text messaging, picture, video, radio, in addition to telephone communication. This requires an arrangement of the components in a package that allows the efficient and ergonomically convenient use of the various functions.

With the introduction of such multi-function electronic devices, it has become increasingly more difficult to design a user interface that enables the user to access the many types of functions and applications available in small hand held devices. It is a particular challenge to present a simple and efficient means by which the user can communicate with the device for browsing, selecting, and operating amidst the wide array of functional choices. The user interface generally consists of a keypad for entering data and commands and a display screen for presenting information relating to operation of the selected function. The keypad and display are in continuous competition for space on the device, as it is desirable that each be as large as possible for ease of use and viewing. This is particularly difficult when it is advantageous to provide a full function keyboard, for example, a QWERTY style keyboard.

It is a purpose of this invention to construct a user interface having several panels nested within a body with the panels slidable into extended positions to maximize the allotment of space to a display, keypad, and a keyboard.

SUMMARY OF THE INVENTION

A multi-function electronic device, such as a combination PDA/cellular telephone is designed to provide a wide variety of functions including, at least, a personal digital assistant, and a cellular telephone. The device consists of a body, an extended base panel, and first and second panels slidably mounted for extension and retraction into the body. The first and second panels slide in opposite directions on the body from an extended position in which operational components, such as keys, buttons and switches are exposed and retracted positions in which the first and second panels within the body.

The body and base panel are constructed as a housing that encloses the components of the device in various known configurations to provide a wide variety of functions and applications. These components may include, for example a microprocessor, mobile telephone transceiver, PDA, camera, display driver firmware, display memory and other processor components depending on the features offered to the user.

In accordance with one aspect of the invention, a display screen is arranged on the top surface of the body and the substantially rectangular shape of the display extends over a majority of the area of the top surface. The base panel provides an upward facing deck that can be used to support a keyboard or other components. One slidable panel extends over the base panel and covers the keyboard deck. A second slidable panel extends in the opposite direction.

In accordance with another aspect of the invention, the second slidable panel contains a portion of a keyboard on its upper surface for use with another portion of the keyboard mounted on the upper deck of the base panel. To allow use of the full keyboard, the slidable panel covering the base panel is retracted. In another aspect of this embodiment, the two portions of the keyboard cooperate to provide a full function keyboard. The display orientation is adjusted to be parallel with the longitudinal axis of the keyboard. The microprocessor controller adapts the display screen in correlation with the panel positions.

In accordance with another aspect of the invention, the slidable panels are linked in a manner that provides coordinated movement of the panels in the same direction, so that when one panel is extended, the other panel retracts and visa versa.

In accordance with another aspect of the invention, when the panel is extended over the base panel to provide mobile communication functions. The upper surface of this panel contains a communication keypad that is useable when the panel is extended and deactivated in the retracted position. The microprocessor controller adapts the display screen to display communication data oriented in the typical cellular phone manner.

In accordance with another aspect of the invention the full function keyboard contains a full QWERTY array of keys and the array is arranged in alignment with the length of the device to maximize its size. In this position the microprocessor controller adapts the display screen to display data relating to a PDA application.

BRIEF DESCRIPTION OF THE DRAWINGS

The device of this invention is explained in more detail below with reference to the accompanying drawing, in which:

FIG. 4 is a sectional view of an optional embodiment of the device along section lines 1a-1a of FIG. 1a;

FIG. 5b is a side schematic view of the embodiment of FIG. 5a.

DETAILED DESCRIPTION OF THE PREFERRED EMBODIMENT(S)

Figure 1A:
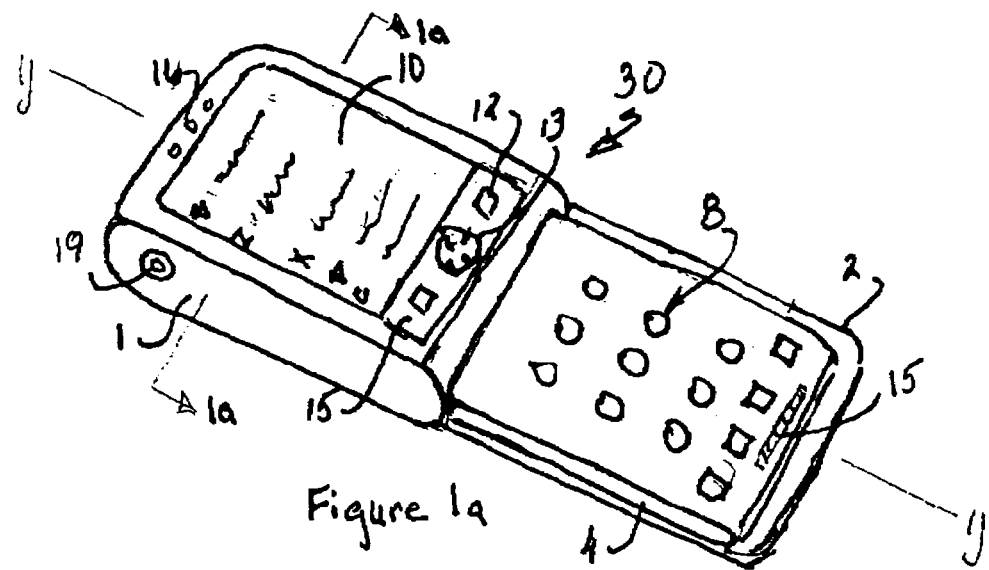
FIGS. 1a, 1b, and 1c are perspective views of an embodiment of a multi-function device of this invention with the sliding panels in a communication mode, intermediate position and PDA mode, respectively.

A multifunctional device 30, for example, a combination PDA and cellular telephone, incorporating features of the present invention is illustrated in the figures. Although the present invention will be described with reference to the embodiments shown in the drawings, it should be understood that the present invention may have many alternate forms. In addition, any suitable size, shape or type of elements or materials could be used.

Multi-function electronic device 30, may be designed to provide a wide variety of functions including, personal digital assistant (PDA), Internet access, cellular telephone, digital camera, clock, radio, and others. For the purposes of describing the subject invention, only the PDA and cellular functions are discussed, but it is intended that the arrangement described herein may be used with many other functions and services.

Figure 1B:
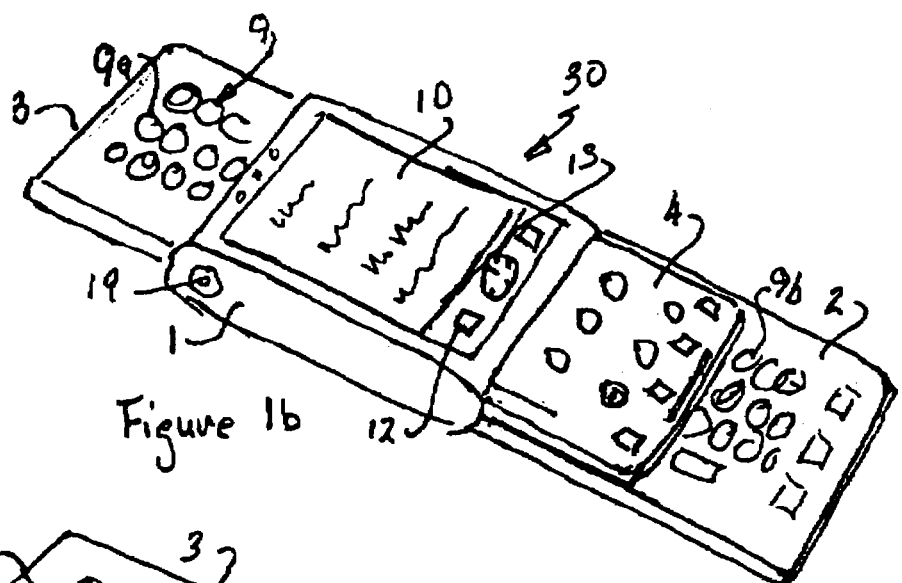
Figure 1C:
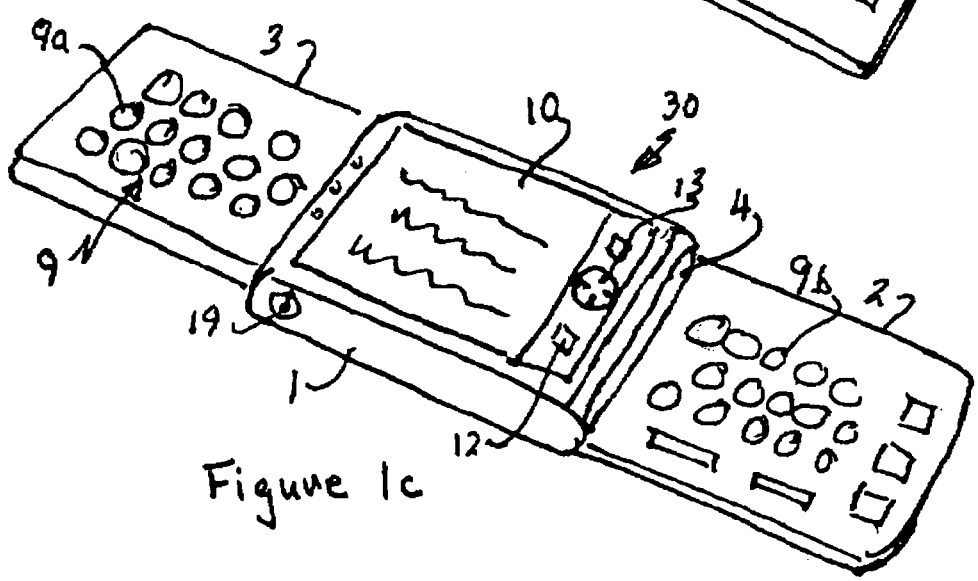
Figure 2A:
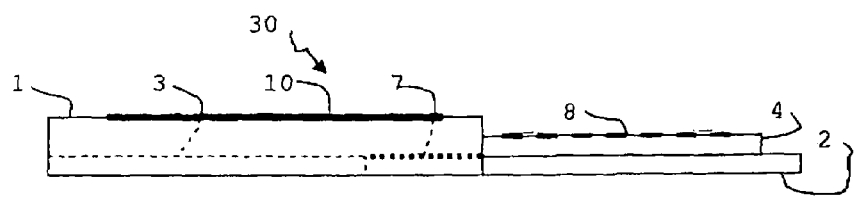
FIGS. 2a, 2b, and 2c are side schematic views of the multi-function device shown in FIGS. 1a-1c with the slidable panels in the various respective modes.
Figure 2B:
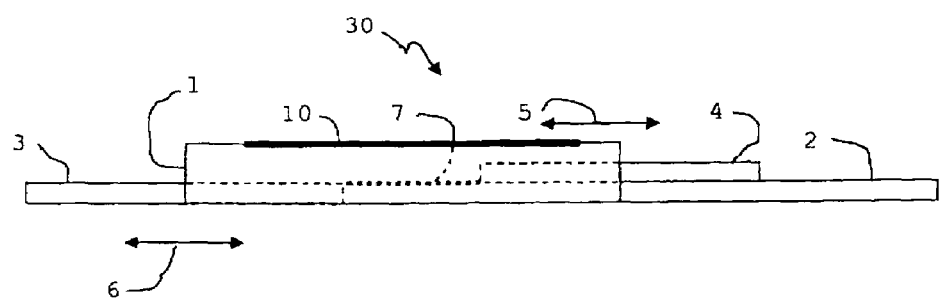
Figure 2C:
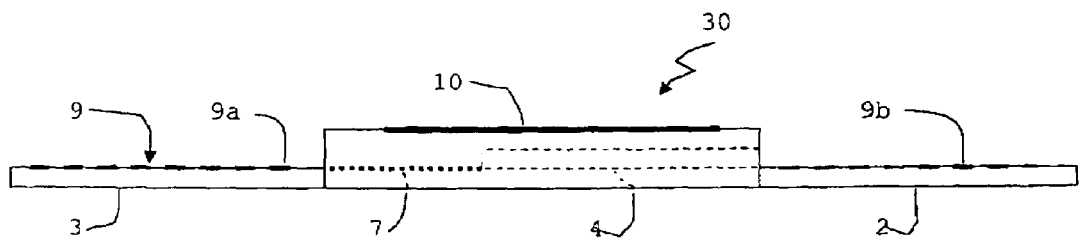

As shown in FIGS. 1 and 2, device 30 is constructed with a body 1 having a base panel 2 extending from a side thereof. Body 1 and base panel 2 provide an enclosure for the components of the device 30 and form a unitary structure having a longitudinal axis y-y. A display screen 10 is mounted on the top surface of body 1 and is connected to the device 30 to display information relative to the operation of the device 30. A first (left hand) slidable panel 3 is mounted within body 1 for movement (see arrow 6 of FIG. 2b), parallel to axis y-y, from a fully retracted position, as shown in FIGS. 1a/2a through the intermediate position of FIGS. 1b/2b, to the fully extended position of FIGS. 1c/2c. Other intermediate positions of operation may be set, depending on the applications and functions provided by the device. Similarly a second (right hand) slidable panel 4 is mounted within body 1 for movement (see arrow 5 of FIG. 2b, parallel to axis y-y, from a fully retracted position, as shown in FIGS. 1c/2c, through the intermediate position of FIGS. 1b/2b, to the fully extended position of FIGS. 1a/2a.

Sliding panel 3 is constructed having a left hand portion 9a of a full function keyboard 9, such as a QWERTY keyboard used in PDA applications. The keyboard portion 9a is exposed for operation in the extended position. Sliding panel 4 is equipped with a keypad 8 for use in a communication application and is operational in the extended position of FIGS. 1a/2a. The upper surface of base panel 2 provides a deck for the mounting of the right hand portion 9b of keyboard 9. Keyboard portions 9a and 9b are connected to provide a full function keyboard user interface in conjunction with the display screen 10.

Figure 4:
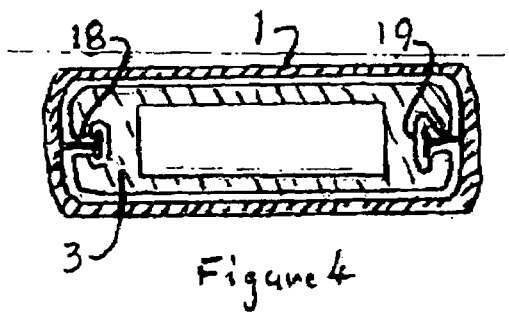

Slidable panels 3 and 4 are mounted to provide a continuous electrical connection with the components of electronic device 30. This can be accomplished through the interface of rail 18 and slot 19, as shown in FIG. 4, or by some other means, such as a flexible cable. In this way the keyboard portion 9a and keypad 8 may be operable in association with the display screen 10 and other components of the device in the selected application. Panels 3 and 4 may also be mechanically linked by link 7 as shown schematically in FIGS. 2a-2c. In the linked embodiment, panels 3 and 4 will move together as one or the other is extended or retracted. Panels 3 and 4 could also be constructed as an integral single element. This facilitates the alternate use of the keypads 8 and 9 in a communication mode, as shown in FIG. 1a, or a PDA mode as shown in FIG. 1c.

Body 1 is of generally rectangular shape and display 2 is mounted thereon in operating connection with the components of the device 30 contained within body 1 and base panel 2. The display screen 10 is arranged on body 1 to maximize its size. As shown, it has a rectangular display area, substantially coextensive with the top surface of body 1. In one embodiment of this invention, display screen 2 is a touch sensitive display adapted to provide operating functions, for example menu selection, Internet browsing, communications.

In another embodiment of this invention additional function keys 12 and browser button 13 can be provided on a keypad deck 14 constructed on the top surface of body 1. Other components of the device 30 may also be contained on the sliding panel 4. As shown in FIG. 1a, for example, a microphone 15 and speaker 16 may be arranged on panel 4 and body 1 respectively. In addition a camera lens 19 could also be contained in body 1, as shown in FIGS. 1a-1c.

Figure 3:
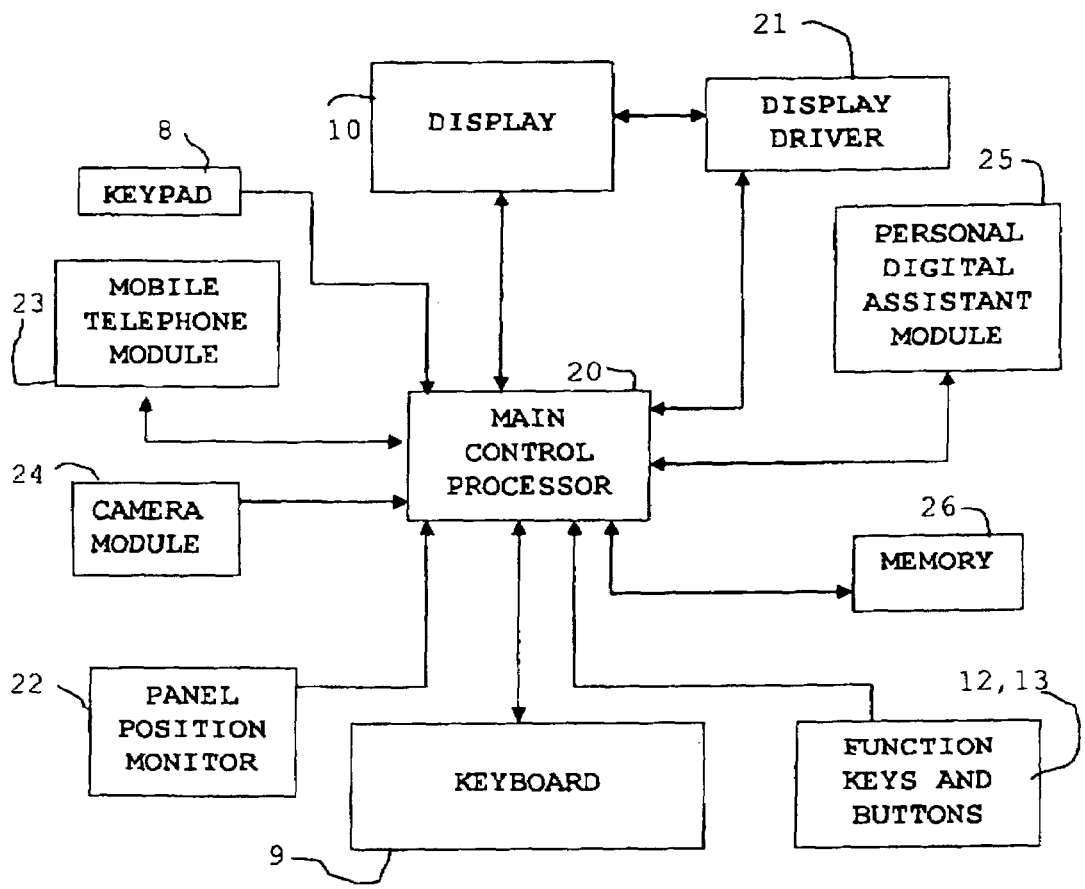
FIG. 3 is a block diagram of a PDA/cellphone according to this invention.

As shown in FIG. 3, the operation of such functional modules, are each controlled through microprocessor controller 20. In addition operational keys and buttons 12 and 13, may be soft keys whose operational functions can be set according to the application selected by the user and by the position of slidable panels 3 and 4, through controller 20 as directed by software stored in memory 26.

An algorithm is stored within the memory 26 of controller 20 that instructs display driver 21 to orient the display according to the positions of the slidable panels 3 or 4 and according to the selected application.

In operation, as shown in FIG. 3, a controller 20 coordinates the operation of the keyboard 9 with the display screen 10. A display driver 21 operatively associated with display screen 10 causes images or data to be oriented on the display screen 10 as needed by the application selected by the user, for example in parallel with the keyboard portions 9a and 9b in the PDA mode of operation and transverse to the axis y-y in the communications mode of operation. A panel position monitor 22 provides a signal indicative of the position of the slidable panels 3 and 4 to prompt the controller 20 to activate the keyboard 9 in a predetermined position, for example when panel 3 is fully extended and, to activate keypad 8 in the extended position of panel 4. Such position signal could also be used to activate soft keys 12, and browser button 13 according to the requirement of a selected application.

In another embodiment of the invention a PDA module 25 is operatively associated with display screen 2 and keyboard 9 through controller 20. Similarly a cellular phone module 23 operates through controller 20. A memory 26 may be provided to store data and programs for executing the various functions provided by the device 30. These components such as controller 20, display driver 21, telephone module 23, PDA module 25, memory 26, may all be enclosed within body 1 and base panel 2.

Figure 5A:
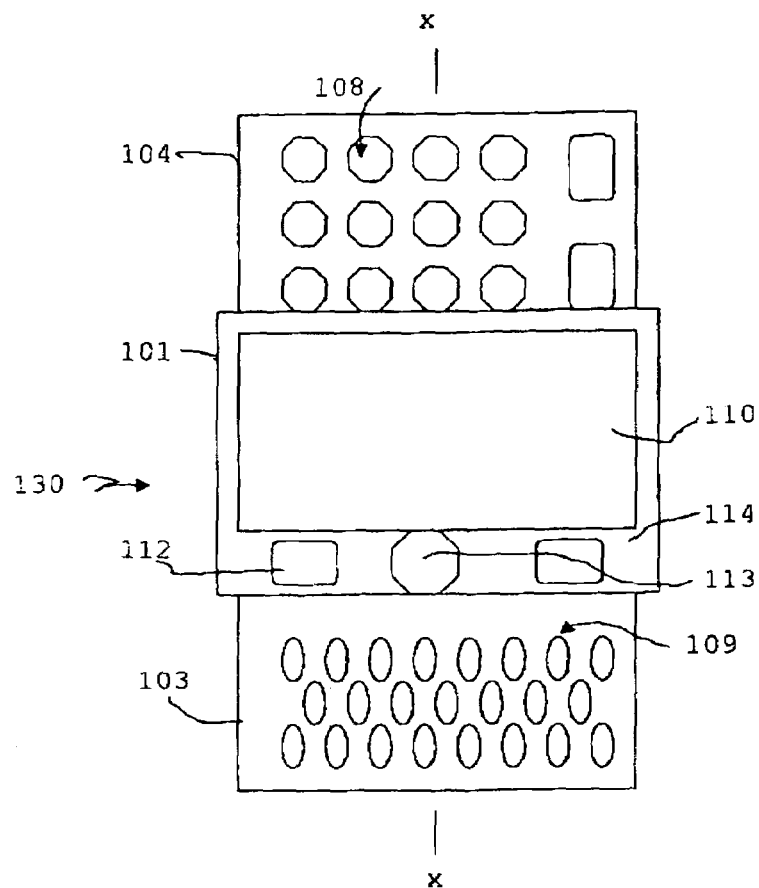
FIG. 5a is a top schematic view of an alternate embodiment of the device of this invention.
Figure 5B:
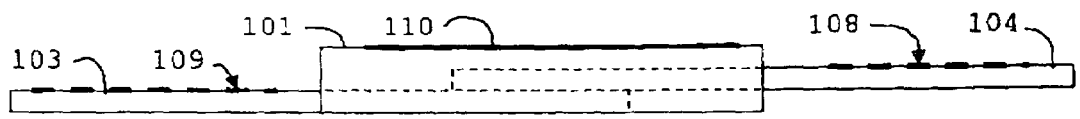

An alternate embodiment of an electronic device 130, according to this invention, is shown in FIGS. 5a and 5b. In this embodiment sliding panels 103 and 104 are mounted on body 101 for sliding motion parallel to axis x-x transverse to the longitudinal axis y-y. A keypad 108, such as a communication keypad, is constructed in panel 104 and a text keyboard 109 is constructed in panel 103 to provide a user interface in conjunction with the display 110 on body 1. Soft keys 112 and browser button 113 may be constructed on deck 114 of body 1. The panels 103 and 104 may be retracted as shown in phantom in FIG. 5b. In another embodiment, panels 103 and 104 may be mechanically linked so that, when one panel is extended, the other is retracted, and visa versa.

It should be understood that the above description is only illustrative of the invention. Various alternatives and modifications can be devised by those skilled in the art with out departing from the invention. Accordingly, the present invention is intended to embrace all such alternatives, modifications and variances which fall with the scope of the appended claims.

The invention claimed is:

1. An electronic device comprising:
   a body adapted to enclose a plurality of electronic components arranged within the body to provide multiple functions selectable by a user;
   a display screen mounted on the body to display data and images in operative association with the plurality of electronic components;
   a first panel slidably mounted within the body for extension and retraction into the body, said first panel having at least a portion of a keyboard mounted thereon;

a second panel slidably mounted within the body, separately from said first panel for extension and retraction into the body, said second panel having a keypad mounted thereon;

wherein said first and second panels extend in parallel overlapping planes within the body; and wherein said first and second panels form a user interface for the electronic device in operative association with the display.

2. The electronic device according to claim 1, wherein the body further includes a base panel extending outward therefrom in the general direction of movement of the second sliding panel and below the second panel.

3. The electronic device according to claim 2 wherein said base panel includes a portion of a keyboard operatively associated with the at least a portion of a keyboard of the first sliding panel, said keyboard portion being operable when said second sliding panel is retracted and said first panel extended.

4. The electronic device according to claim 3, wherein said keyboard portions cooperate to provide a full function keyboard.

5. The electronic device according to claim 4, wherein the full function keyboard is a QWERTY style keyboard.

6. The electronic device according to claim 1, wherein the keypad is a communication keyboard to provide a user interface in cooperation with the display for a communication application of the electronic device.

7. The electronic device according to claim 1, wherein the keyboard is a text style keyboard to provide a user interface in cooperation with the display for a data processing application of the electronic device.

8. The electronic device for according to claim 1, wherein the display screen is arranged to be substantially coextensive with the top surface of the body to maximize the potential area on which data and images can be displayed.

9. The electronic device according to claim 1, wherein the display screen is touch sensitive.

10. The electronic device according to claim 1, further comprising a controller adapted to coordinate the operation of the display with the position of the sliding panels such that the data and images displayed are oriented in parallel relation to the keyboard or keypad depending which is in use.

11. The electronic device according to claim 1, wherein the body has a longitudinal axis and the sliding motion of the panels are parallel to said longitudinal axis.

12. The electronic device according to claim 1, wherein the body has a longitudinal axis and the sliding motion of the panels is transverse to said longitudinal axis.

13. The electronic device according to claim 1, wherein the body has a longitudinal axis and the sliding motion of the panels is transverse to said longitudinal axis and further wherein the keyboard is arranged on the first panel in a parallel relation to said longitudinal axis.

14. The electronic device, according to claim 1, further comprising:
a controller adapted to coordinate the operation of the device to provide multiple functions;
first program code for causing said controller to respond to signals received from the keyboard and keypads according to the function selected by the user and the position of the panels; and
second program code for causing said controller to display images on the display screen in response to the position of the sliding panels, wherein the data and images displayed are oriented in parallel relation to the keyboard or keypad in accordance with the selected function.

15. The electronic device, according to claim 14, further comprising third program code for causing said controller to adapt softkeys mounted on the panels to provide predetermined functions in response to the position of the sliding panels.

16. The electronic device, according to claim 1, wherein the electronic device is a mobile communication device.

17. An electronic device comprising:
a body adapted to enclose a plurality of electronic components arranged within the body to provide multiple functions selectable by a user;
a display screen mounted on the body to display data and images in operative association with the plurality of electronic components;
a first panel slidably mounted within the body for extension and retraction into the body, said first panel having at least a portion of a keyboard mounted thereon;
a second panel slidably mounted within the body, for extension and retraction into the body, said second panel having a keypad mounted thereon;
wherein said first and second panels form a user interface for the electronic device in operative association with the display; and
wherein the first and second panels are linked such that when the first panel is extended the second panel is retracted and when the first panel is retracted the second panel is extended.

* * * * *